US008532400B1

(12) United States Patent
Babenko et al.

(10) Patent No.: US 8,532,400 B1
(45) Date of Patent: *Sep. 10, 2013

(54) SCENE CLASSIFICATION FOR PLACE RECOGNITION

(75) Inventors: Boris Babenko, Irvine, CA (US); Hartwig Adam, Marina Del Rey, CA (US); John Flynn, Marina Del Rey, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,350

(22) Filed: Jul. 24, 2012

Related U.S. Application Data

(63) Continuation of application No. 12/632,284, filed on Dec. 7, 2009, now Pat. No. 8,238,671.

(51) Int. Cl.
*G06K 9/62* (2006.01)

(52) U.S. Cl.
USPC ............................................. 382/224

(58) Field of Classification Search
None
See application file for complete search history.

(56) References Cited

U.S. PATENT DOCUMENTS

| | | | |
|---|---|---|---|
| 5,926,116 A | 7/1999 | Kitano et al. | |
| 6,222,939 B1 | 4/2001 | Wiskott et al. | |
| 6,272,231 B1 | 8/2001 | Maurer et al. | |
| 6,301,370 B1 | 10/2001 | Steffens et al. | |
| 6,356,659 B1 | 3/2002 | Wiskott et al. | |
| 6,400,374 B2 | 6/2002 | Lanier | |
| 6,466,695 B1 | 10/2002 | Potzsch et al. | |
| 6,563,950 B1 | 5/2003 | Wiskott et al. | |
| 6,580,811 B2 | 6/2003 | Maurer et al. | |
| 6,714,661 B2 | 3/2004 | Buddenmeier et al. | |
| 6,834,115 B2 | 12/2004 | Maurer et al. | |
| 6,917,703 B1 | 7/2005 | Steffens et al. | |
| 6,940,454 B2 | 9/2005 | Paetzold et al. | |

(Continued)

OTHER PUBLICATIONS

Lowe, D.G., Object Recognition from Local Scale-Invariant Features, Proc. of the International Conference on Computer Vision, Corfu, Sep. 1999, pp. 8.

(Continued)

*Primary Examiner* — Brian P Werner
(74) *Attorney, Agent, or Firm* — Lerner, David, Littenberg, Krumholz & Mentlik, LLP

(57) ABSTRACT

Aspects of the invention pertain to identifying whether or not an image from a user's device is of a place. Before undertaking time and resource consuming analysis of an image using specialized image analysis modules, pre-filtering classification is conducted based on image data and metadata associated with the image. The metadata may include geolocation information. One classification procedure analyzes the metadata to perform a high level determination as to whether the image is of a place. If the results indicate that it is of a place, then a further classification procedure may be performed, where the image information is analyzed, with or without the metadata. This process may be done concurrently with a place match filtering procedure. The results of the further classification will either find a match with a given place or not. The output is a place match either with or without geolocation information.

20 Claims, 12 Drawing Sheets

(56) References Cited

U.S. PATENT DOCUMENTS

| | | | |
|---|---|---|---|
| 7,050,624 B2 | 5/2006 | Dialameh et al. | |
| 7,050,655 B2 | 5/2006 | Ho et al. | |
| 7,565,139 B2 * | 7/2009 | Neven et al. | 455/414.3 |
| 7,899,252 B2 * | 3/2011 | Boncyk et al. | 382/181 |
| 8,131,118 B1 | 3/2012 | Jing et al. | |
| 2005/0104976 A1 * | 5/2005 | Currans | 348/231.5 |
| 2005/0185060 A1 | 8/2005 | Neven | |
| 2006/0050933 A1 | 3/2006 | Adam et al. | |
| 2010/0103463 A1 | 4/2010 | Joshi et al. | |
| 2011/0052073 A1 * | 3/2011 | Wallace et al. | 382/190 |

OTHER PUBLICATIONS

Wang et al., Method and Apparatus for Geo-named Object Identification, IP.com Prior Art Database, IPCOM000134145D, Feb. 24, 2006, 8 pages, U.S. Appl. No. 12/868,653.

Ching-Ming Tsai et al., Extent: Inferring Image Metadata from Context and Content, IEEE, 2005, 4 pages.

Hays et al., IM2GPS: Estimating Geographic Information from a Single Image, IEEE, 2008, 8 pages.

* cited by examiner

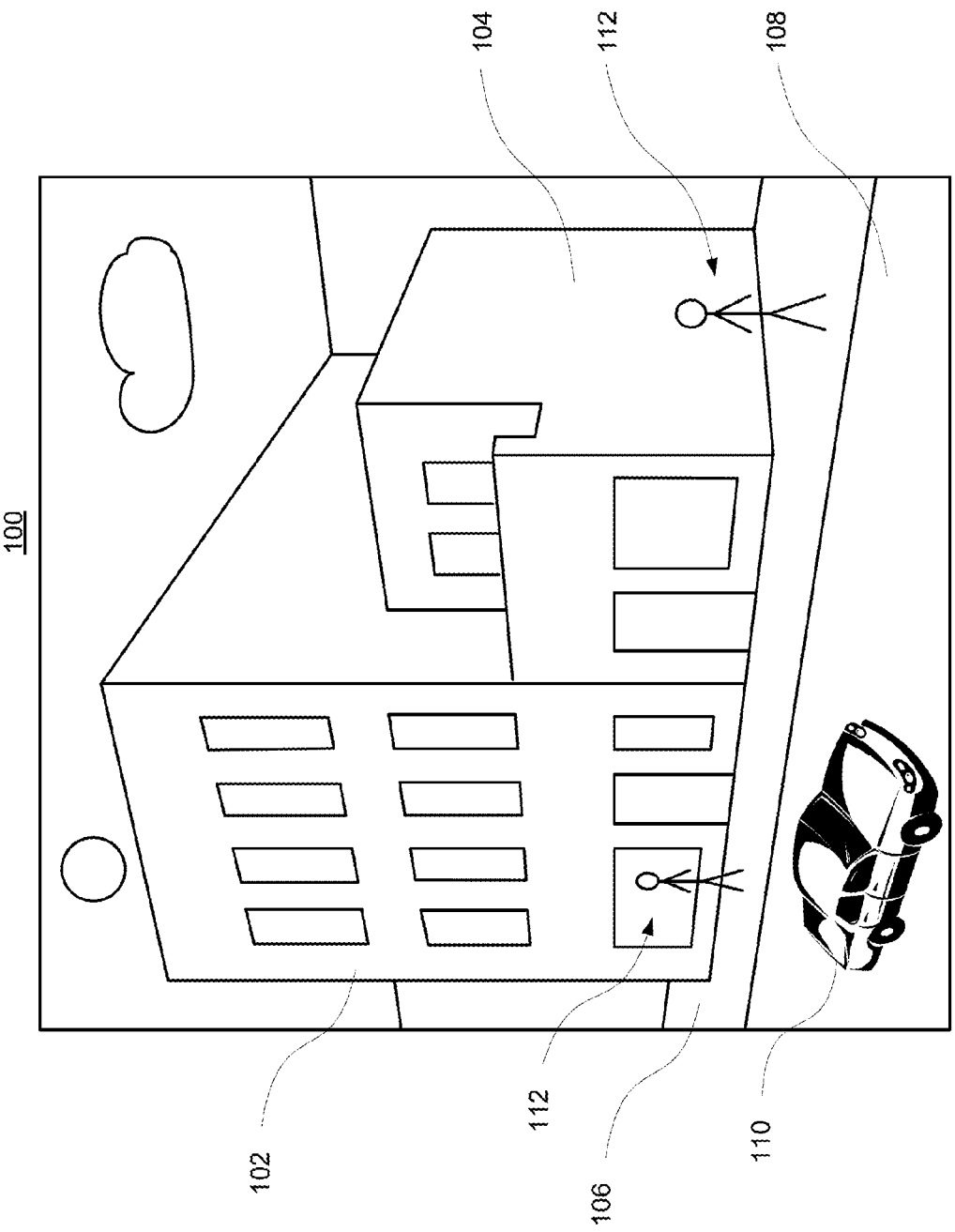

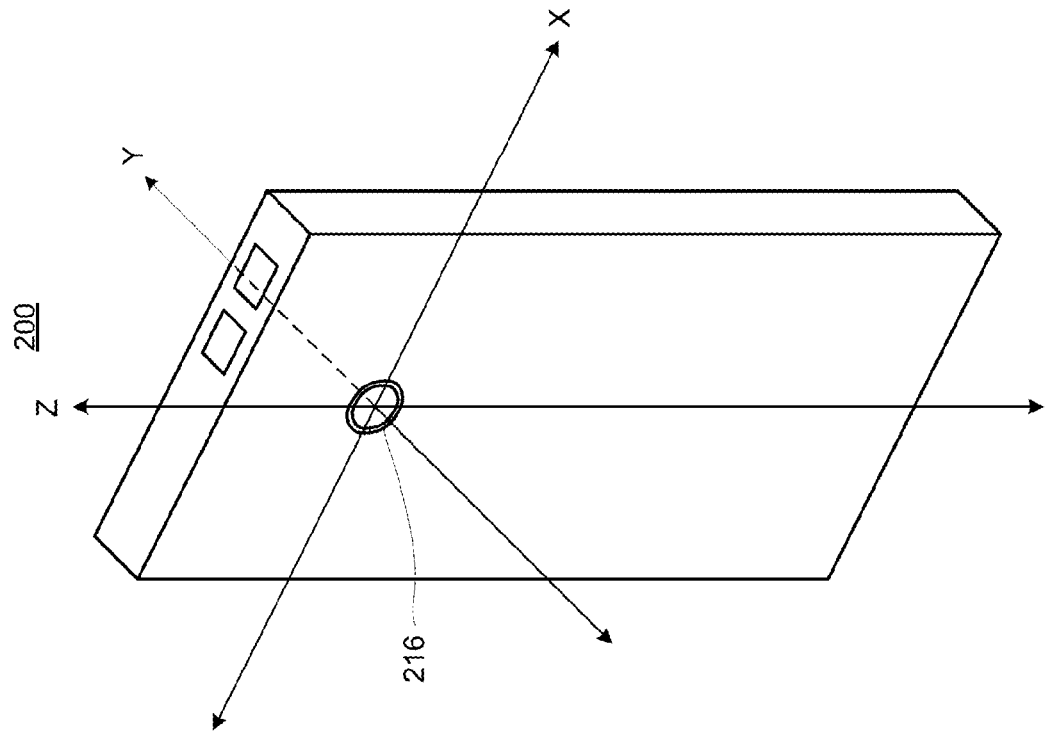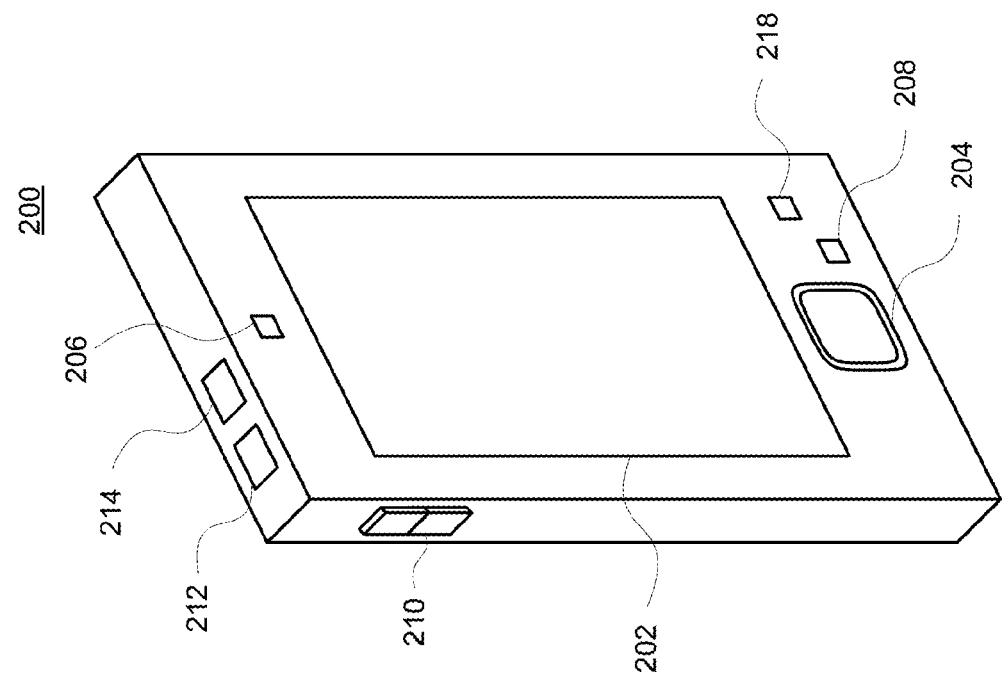

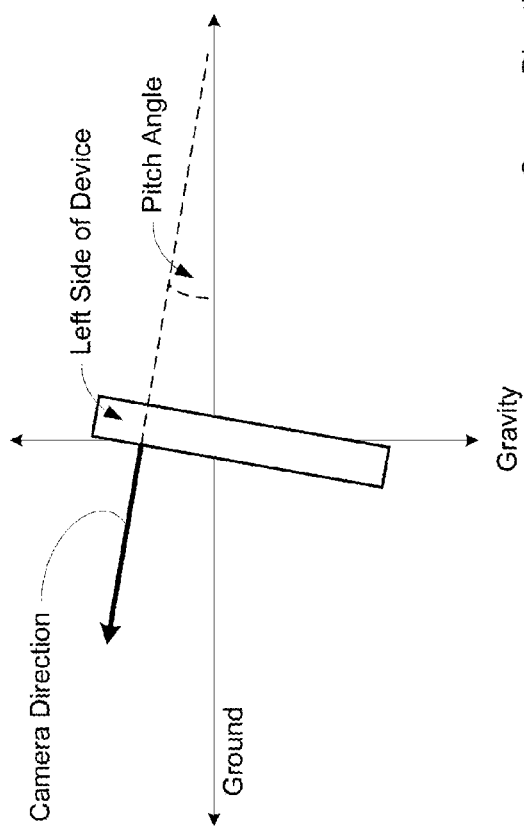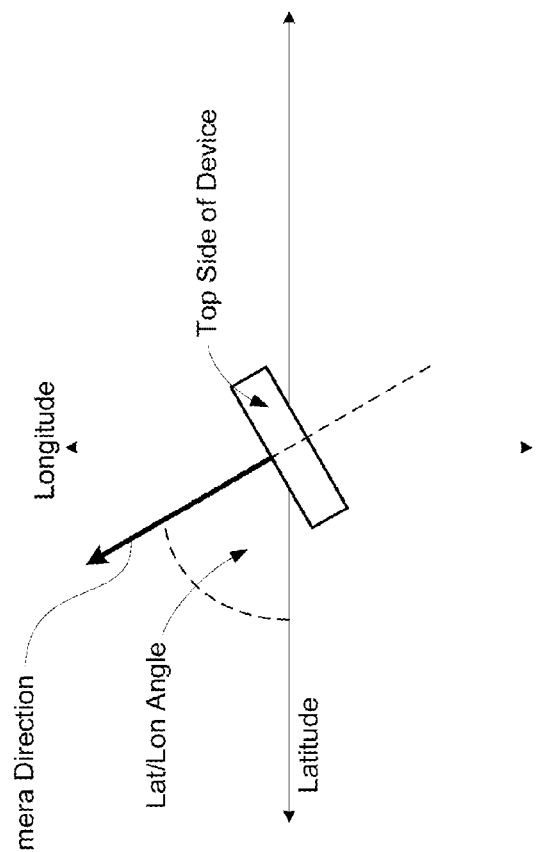

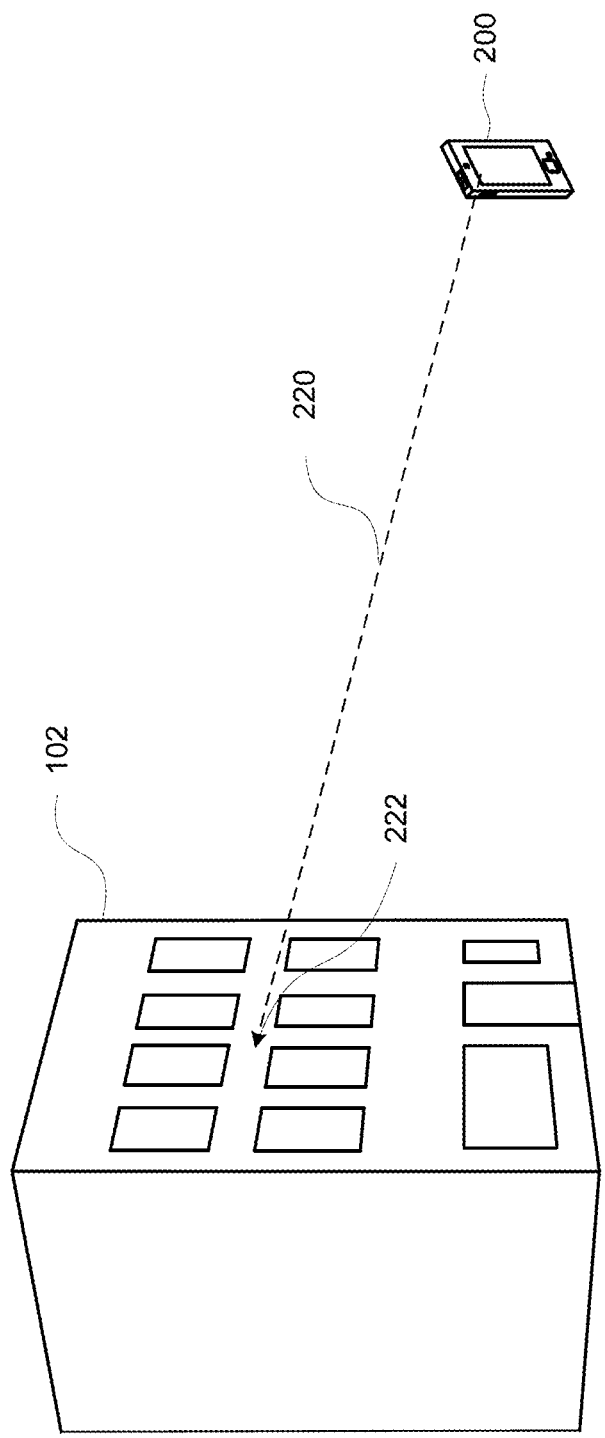

SCENE CLASSIFICATION FOR PLACE RECOGNITION

CROSS-REFERENCE TO RELATED APPLICATIONS

The present application is a continuation of U.S. patent application Ser. No. 12/632,284, filed Dec. 7, 2009, the entire disclosure of which is hereby incorporated herein by reference.

BACKGROUND OF THE INVENTION

1. Field of the Invention

Aspects of the invention relate generally to digital imagery. More particularly, aspects are directed to the identification or classification of such imagery.

2. Description of Related Art

Mobile user devices such as cellular telephones and personal digital assistants ("PDAs") often include digital cameras among other features. Such devices marry the benefits of wireless access with electronic photography. A user may take pictures of friends and family, points of interest, etc., and share those pictures instantly.

Image recognition can be used on the pictures. For instance, applications such as mobile visual search programs may analyze these pictures in an attempt to identify features such as points of interest and the like. The results of the searches may include a description of the item identified. However, mobile visual searching can be computationally intensive as well as time consuming. Aspects of the invention address these and other problems.

SUMMARY OF THE INVENTION

In one embodiment, a method of classifying an image comprises receiving an image and metadata of the image from a user device; performing a first classification of the image using only the metadata to determine whether the image is a place; performing a second classification of the image using both the metadata and information about the image to determine whether the image is the place; and if either the first or second classification determines that the image is of the place, then providing place information to the user device.

In one alternative, the method further comprises performing place match filtering on the image by comparing features of the image against a database of stored imagery. In this case, performing the second classification may be done in parallel with performing the place match filtering.

In another alternative, the first classification is performed prior to the second classification. In a further alternative, if neither the first nor the second classification determines that the image is of the place, then the method further comprises performing filtering to determine whether the image is of an object or a person.

In one example, if different filter modules identify the image as being of different types, then the first and second classifications are used to select which filter module identification is correct. In another example, the image information is selected from the group consisting of edges, color settings, texture, zoom level and shutter speed. In a further example, the metadata includes a location of the user device when the image was taken.

In another alternative, the metadata is selected from the group consisting of location coordinates, device orientation, accelerometer information and location accuracy. In this case, the device orientation desirably includes at least one of angle, pitch, roll or compass point direction.

In accordance with another embodiment, an apparatus for classifying an image is provided. The apparatus comprises means for communicating with a mobile user device and at least one processor coupled to the communicating means. The at least one processor is configured to receive an image and metadata of the image from a user device; store the image and metadata in memory; perform a first classification of the image using only the metadata to determine whether the image is a place; and perform a second classification of the image using both the metadata and information about the image to determine whether the image is the place. If either the first or second classification determines that the image is of the place, then the processor is configured to provide place information to the user device.

In one example, the at least one processor is further configured to perform place match filtering on the image by comparing features of the image against a database of stored imagery. Here, the at least one processor desirably performs the second classification in parallel with the place match filtering.

In another example, the metadata includes location information of the user device when the image was taken. Here, the location information desirably includes at least one of location coordinates, device orientation, accelerometer information and location accuracy.

In a further example, the at least one processor is configured to perform a training procedure on a set of training images to set false positive and false negative thresholds for the first and second classifications. And in this case, the training procedure desirably employs a statistical machine learning process to obtain measurement weights and measurement thresholds.

In yet another aspect, an apparatus is configured to perform a method of classifying an image. The apparatus includes means for communicating with a mobile user device and at least one processor coupled to the communicating means. The at least one processor is configured to perform the method, which comprises receiving an image and metadata of the image from a user device; performing a first classification of the image using only the metadata to determine whether the image is a place; performing a second classification of the image using both the metadata and information about the image to determine whether the image is the place; and when either the first or second classification determines that the image is of the place, then preparing place information for presentation by the user device; wherein if different filter modules identify the image as being of different types, then the first and second classifications are used to select which filter module identification is correct.

In one example, the image information is either a zoom level or a shutter speed. In another example, the metadata includes a location of the user device when the image was taken. In a further example, the metadata is location accuracy information. In yet another example, the metadata comprises location statistics. In a further example, the metadata is a device orientation that includes at least one of angle, pitch, roll or compass point direction. And in yet another example, the metadata includes an orientation of the image.

A tangible, non-transitory computer-readable recording medium is also provide, which stores a computer program that, when executed by a processor, causes the processor to perform the method of classifying an image.

BRIEF DESCRIPTION OF THE DRAWINGS

FIG. 1 illustrates an image of interest.

FIGS. 2A-B illustrate a mobile user device in accordance with aspects of the invention.

FIGS. 3A-B illustrate camera angle parameters.

FIG. 4 illustrates an image capture process.

DETAILED DESCRIPTION

Figure 5:
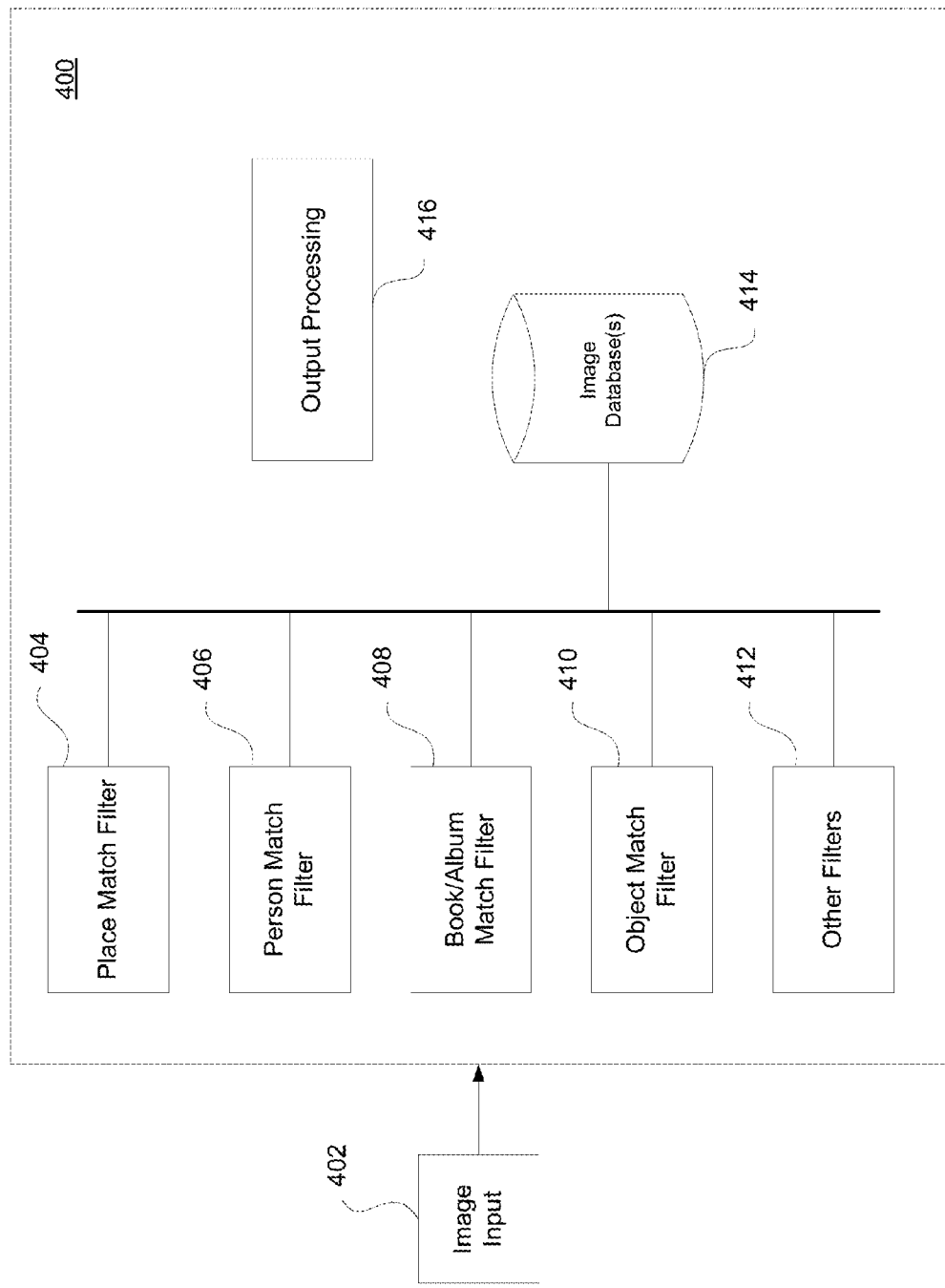
FIG. 5 illustrates an image processing system in accordance with aspects of the invention.

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

As noted above, users of mobile devices may take pictures of people, places or things of interest. FIG. 1 is an exemplary image 100 which may be captured by a mobile user device. An example of a street level image is an image of geographic objects, people and/or objects that was captured by a camera at an angle generally perpendicular to the ground, or where the camera is positioned at or near ground level. Both the geographic objects in the image and the camera have a geographic location relative to one another. Thus, as shown in FIG. 1, the street level image 100 may represent various geographic objects such as buildings 102 and 104, a sidewalk 106, street 108, vehicle 110 and people 112. It will be understood that while street level image 100 only shows a few objects for ease of explanation, a typical street level image will contain as many objects associable with geographic locations (street lights, signs and advertisements, mountains, trees, sculptures, bodies of water, storefronts, etc.) in as much detail as may be captured by an imaging device such as a digital camera.

In addition to being associated with geographic locations, images such as street level image 100 may be associated with information indicating the orientation of the image. For example, if the street level image comprises a typical photograph, the orientation may simply be the camera angle such as an angle that is 30° east of true north and rises 2° from ground level. If the street level images are panoramic images, such as 360° panoramas centered at the geographic location associated with the image, the orientation may indicate the portion of the image that corresponds with looking due north from the camera position at an angle directly parallel to the ground.

FIGS. 2A-B illustrate a mobile user device 200 that is configured to capture images. As shown in FIG. 2A, the mobile user device 200 may be a PDA or cellular telephone having a touch-screen display 202, general-purpose button 204, speaker 206, and microphone 208 on the front. The left side includes volume button(s) 210. The top side includes an antenna 212 and GPS receiver 214. As shown in FIG. 2B, the back includes a camera 216. The camera may be oriented in a particular direction (hereafter, "camera angle"). And as shown in the front panel of FIG. 2A, a zooming button or other actuator 218 may be used to zoom in and out of an image on the display.

The camera may be any device capable of capturing images of objects, such as digital still cameras, digital video cameras and image sensors (by way of example, CCD, CMOS or other). Images may be stored in conventional formats, such as JPEG or MPEG. The images may be stored locally in a memory of the device 200, such as in RAM or on a flash card. Alternatively, the images may be captured and uploaded into a remote database.

The camera angle may be expressed in three-dimensions as shown by the X, Y and Z axes in FIG. 2B and schematically in FIGS. 3A and 3B. It shall be assumed for ease of understanding and not limitation that the camera angle is fixed relative to the orientation of the device. In that regard, FIG. 3A illustrates a potential pitch of the device (as seen looking towards the left side of the device) relative to the ground, e.g., relative to the plane perpendicular to the direction of gravity.

FIG. 3B illustrates a potential latitude/longitude angle of the device (as seen looking down towards the top side of the device), e.g., the camera direction in which the camera points relative to the latitude and longitude. Collectively, the pitch and latitude/longitude angle define a camera pose or location and orientation. The roll (rotation about the Y axis of FIG. 2B), yaw/azimuth and/or altitude may also be captured. This and other image-related information may be outputted as numerical values by an accelerometer (not shown) or other component in the device 200, used by the device's processor, and stored in the memory of the device.

In one aspect, a user may position the client device 200 with the camera 216 facing an object of interest. In that regard, as shown in FIG. 4, the user may stand in front of an object of interest, such as a building or monument, and orient the camera 216 in a direction 220 that points toward a spot 222 on the point of interest.

The camera 216 of the client device 200 may be used to help the user orient the device to the desired position on the object of interest, here building 102. In this regard, the display 202 may also display a target, bull's-eye or some other indicator to indicate the exact or approximate position of the object at which the device 200 is pointed.

Once an image is captured, the user may elect to share the image with others. Or, alternatively, the user may look for more information about an object in the image. A visual search application may be employed to identify information about the image. Then, relevant information concerning the image may be provided to the user. In a case where the image is sent to others or stored in an external database, the relevant information about the image may also be stored or indexed with the image. However, a primary issue is the proper analysis and classification of the image.

FIG. 5 illustrates an image processing system 400 for receiving images from an input 402, analyzing the imagery for classification and indexing, and outputting information concerning the imagery. As shown, the system 400 may have a number of filtering modules to identify what type of image has been received, or what the objects are in the received image. These may include a place match filter module 404, a person match filter 406, a book or album match filter 408, and an object match filter 410. Other filter modules 412 may also be employed. The filter modules may employ different techniques for analyzing images. For instance, the person match filter 406 may include face recognition software.

The modules are shown as being connected to one or more image databases 414. These databases may store previously identified images as well as images awaiting processing. The modules may compare a received image with images stored in the database(s) 414. The modules may operate in series or parallel fashion. An output processing module 416 uses the results of the filtering modules to, for example, provide feedback to the mobile user device regarding the image, provide directed advertising or update the image database(s).

Figure 6:
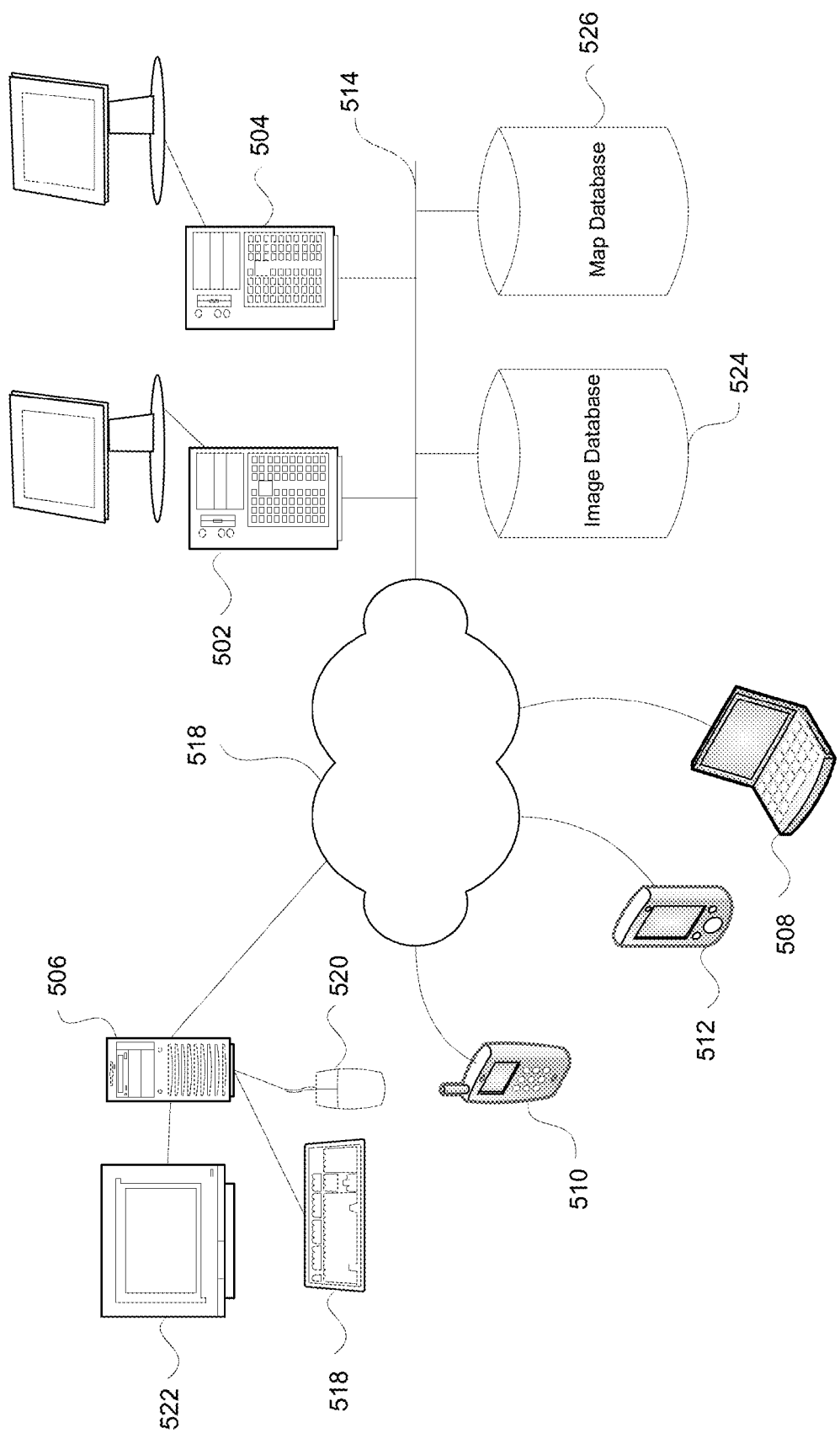
FIG. 6 illustrates a computer system for use with aspects of the invention.

While it is possible to perform such image processing locally on the mobile user device, it may be more feasible to do the processing remotely. For instance, an application server may perform the image processing. FIG. 6 illustrates an example of a system 500 including an application server and mobile user devices in accordance with aspects of the invention.

As shown in FIG. 6, the system 500 presents a schematic diagram depicting various computing devices that can be used alone or in a networked configuration in accordance with aspects of the invention. For example, this figure illustrates a computer network having a plurality of computers 502, 504 and 506 as well as other types of devices such as mobile user devices such as a laptop/palmtop 508, mobile phone 510 and a PDA 512. The mobile user devices may include the components discussed above with regard to mobile user device 200. Various devices may be interconnected via a local bus or direct connection 514 and/or may be coupled via a communications network 516 such as a LAN, WAN, the Internet, etc. and which may be wired or wireless.

Each computer device may include, for example, user inputs such as a keyboard 518 and mouse 520 and/or various other types of input devices such as pen-inputs, joysticks, buttons, touch screens, etc., as well as a display 522, which could include, for instance, a CRT, LCD, plasma screen monitor, TV, projector, etc. Each computer 502, 504, 506 and 508 may be a personal computer, server, etc. By way of example only, computer 506 may be a personal computer while computers 502 and 504 may be servers. Databases such as image database 524 and map database 526 may be accessible to one or more of the servers or other devices.

Figure 7:
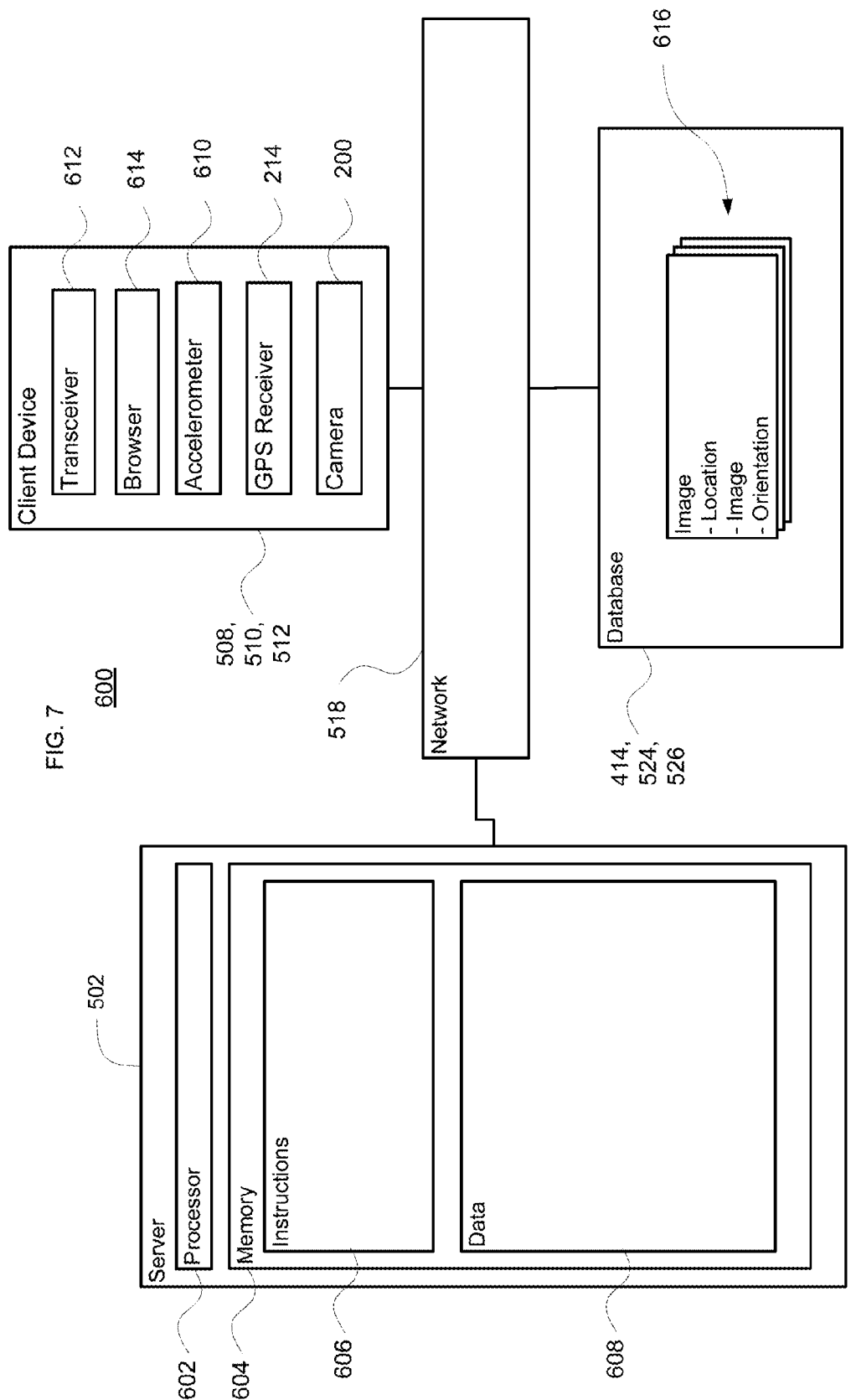
FIG. 7 illustrates aspects of the computer system of FIG. 6.

As shown in diagram 600 of FIG. 7, the devices contain a processor 602, memory/storage 604 and other components typically present in a computer. Memory 604 stores information accessible by processor 602, including instructions 606 that may be executed by the processor 602. It also includes data 608 that may be retrieved, manipulated or stored by the processor. The memory may be of any type capable of storing information accessible by the processor, such as a hard-drive, memory card, ROM, RAM, DVD, CD-ROM, Blu-Ray™ Disc, write-capable, and read-only memories. The processor 602 may be any well-known processor, such as processors from Intel Corporation or Advanced Micro Devices. Alternatively, the processor may be a dedicated controller such as an ASIC.

The instructions 606 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. For example, instructions 606 may include image processing programs for analyzing received imagery. Functions, methods and routines of the instructions are explained in more detail below.

Data 608 may be retrieved, stored or modified by processor 602 in accordance with the instructions 606. For instance, although systems and methods according to aspects of the invention are not limited by any particular data structure, the data may be stored in computer registers, in a relational database as a table having a plurality of different fields and records, XML documents, or flat files. The data may also be formatted in any computer-readable format. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Although FIG. 7 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on a removable CD-ROM or DVD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 502 is a server communicating with one or more mobile user devices 508, 510 or 512 and a database such as image database 414. For example, computer 502 may be a web server or application server. Each mobile user device may be configured similarly to the server 502, with a processor, memory and instructions. Each mobile user device may also include a wireless transceiver (e.g., cellular telephone transceiver, Bluetooth, 802.11-type modem or WiFi). As shown in FIG. 7, the database desirably stores images 616, including, for example, the location and orientation (if known) of each image.

In addition to having a processor, memory, a display and the like, the mobile user devices 508, 510 and 512 desirably also include the camera 200, GPS receiver 214, an accelerometer 610 and, a transceiver 612 for communication with a network or individual remote devices. A browser 614 or other user interface platform may work in conjunction with the display and user input(s).

Given the above, image processing using the match filter modules of FIG. 5 may be done, e.g., by server 502 and/or other servers such as server 504. The mobile user device transfers the images and relevant metadata (e.g., location and orientation information) to the server. As noted above, multiple match filter modules may be employed. Depending upon the server's resources, this may be computationally intensive and time consuming.

Figure 8:
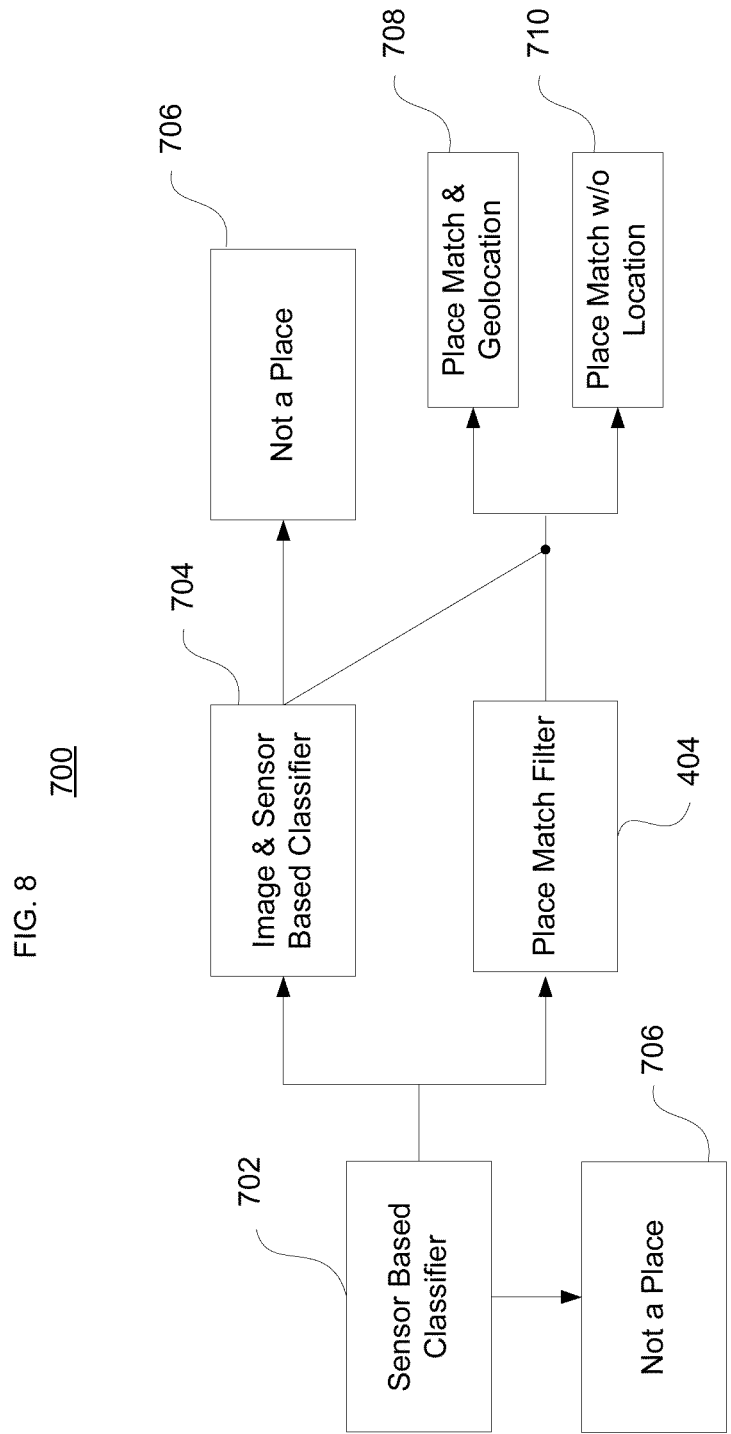
FIG. 8 illustrates a classification system in accordance with aspects of the invention.

One way to increase efficiency is to make an initial determination as to whether the image is of a certain type or not. For instance, a pre-filtering module is desirably employed to determine whether the image is of a place or not. FIG. 8 illustrates one example of a pre-filtering module 700 in accordance with aspects of the invention. As shown, the pre-filtering module 700 includes a sensor based classifier 702, an image and sensor based classifier 704 and the place match filter 404.

The sensor based classifier 702 uses metadata received from the mobile user device to provide an initial determination as to whether the image is a place (e.g., building, arena, etc.) or not. The metadata may include the location, such as GPS coordinates, time of day or time of year, orientation of the device (e.g., angle, pitch, roll and/or compass point), accelerometer information, and accuracy of the (GPS) location, as well as GPS location statistics (e.g., urban vs. rural vs. wilderness). It should be understood that accuracy, such as location accuracy, depends on different factors, including whether the device is indoors or outside, the number of receivers used, time of day, season and the like.

The sensor based classifier 702 compares some or all of the metadata associated with a given image with at least a subset of the imagery in an image database. Using the metadata may be less accurate than other methods, such as using the image and sensor-based classifier 704, but is substantially less computationally intensive and provides rapid initial results. For example, the metadata may indicate that the image was taken in New York City around the site of Madison Square Garden. Thus, the image is likely of a place, and the processing proceeds as follows.

If the initial results indicate that the image is of a place, then enhanced image analysis is undertaken. As shown, the next stage of the pre-filtering module 700 desirably includes a more robust image and sensor based classifier 704 as well as place match filter 404. At the image and sensor based classifier 704, some or all of the metadata is analyzed in combination with information from the image itself. Such image data may include, by way of example only, blurry or sharp regions, color settings or statistics (e.g., color correction settings or a color histogram), vertical and/or horizontal edges, line counts, DCT or other image processing filtering, zoom level, focal length or focus distance, shutter speed, texture and whether there is any text.

Here, a more refined analysis is performed using the image data in view of the location, comparing this information against likely candidates in the image database. Thus, using the above example, it may be determined that the image is of the north side of Madison Square Garden. Using certain image data, it may be determined that the arena is in the background and that the focus of the image is of a person in the foreground. When it is determined that the image is not a place, this phase of analysis may terminate at block 706. Then other match filter modules may be employed to determine who (or what) the image is of. Furthermore, by determining that the image is not of a place in an initial stage, it means that the system does not need to perform a more complicated and time consuming place analysis. This frees up system resources for analysis of other imagery.

The place match filter 404 may perform a "brute force" analysis of image data against the image database. For instance, the place match filter 404 may attempt to correlate the image with certain imagery in the database. This may or may not take into account any of the metadata analyzed in the previous stage.

Upon completion of processing by the place match filter 404, or upon a determination that the image is of a place by the image and sensor based classifier 704, one of two results will occur. If either classifier returns a high confidence value (e.g., 85% likelihood or greater) and if the place match filter 404 is able to find a match, then an appropriate geolocation is identified along with the place match in block 708. Alternatively, if the classifier provides a positive place recognition but the place match filter 404 fails to find a match, then there is at least a rough geolocation of the point of interest. Thus, a list of local businesses or other local results may be provided.

The functions performed by the pre-filtering module 700 may be used to estimate the likelihood that a user is interested in geolocation information based on a submitted image or photo query. This is very useful in visual search and augmented reality applications.

While the pre-filtering module 700 is shown as a two-stage implementation, operations may be performed in a different order or in parallel. For instance, the sensor based classifier 702 may operation in parallel with the image and sensor based classifier 704 and/or the place match filter 404. Alternatively, the place match filter 404 and other filters may perform an initial analysis and the classifiers 702 and/or 704 may be used to break a tie if two or more filters return positive results.

The operations of the pre-filtering module 700 may also be used to enhance augmented reality applications. For instance, it may be used to identify when to surface place relevant place information such as points of interest or businesses, even if there is no street level match due to lack of coverage or different illumination conditions.

Figure 9A:
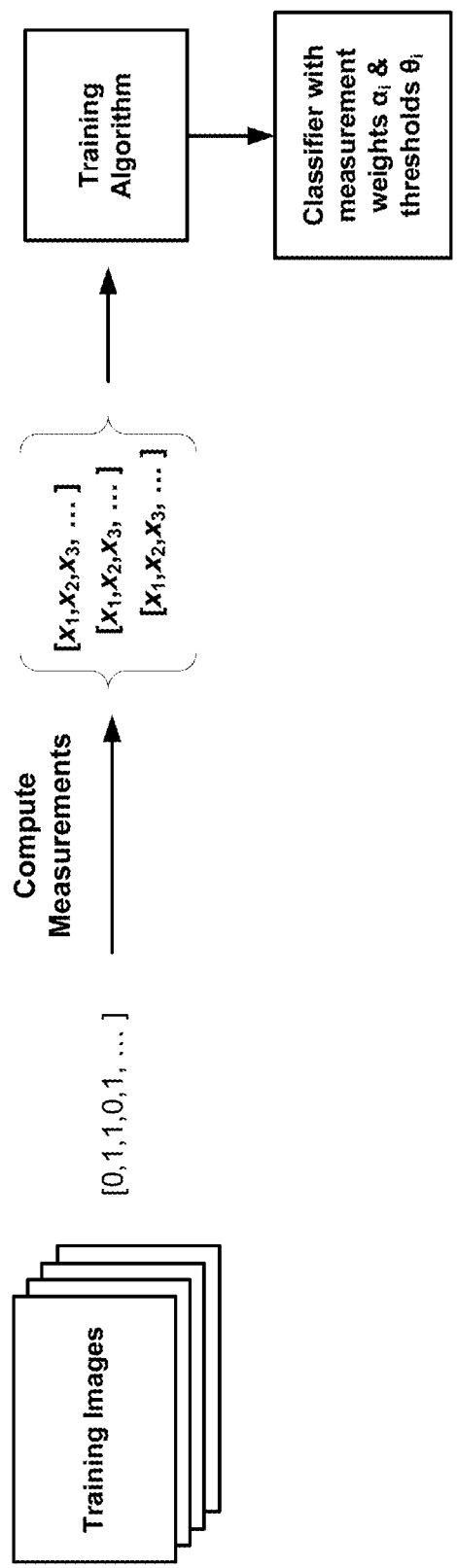
FIGS. 9A-B illustrate training and image analysis in accordance with aspects of the invention.

Before performing classification on unknown images, it is desirable to conduct a training procedure with the classifiers. FIG. 9A illustrates an exemplary training procedure. As shown, multiple training images are used. Each training image is labeled as either a place ("1") or not a place ("0"). Measurements are computed for each image. These may include any of the image data discussed above. These measurements are based on image information and/or metadata of each test image. The result is a series of variables (e.g., "[$x_1$, $x_2$, $x_3$, . . . ]") for each test image.

The series of variables are applied to a training algorithm. The training algorithm may be, by way of example only, a statistical machine learning algorithm such as the well-known AdaBoost algorithm. Alternative techniques may be employed, such as support vector machines, logistic regression and/or decision trees. The output of the training algorithm desirably includes measurement weights ("$\alpha_i$") and measurement thresholds ("$\theta_i$").

Figure 10A:
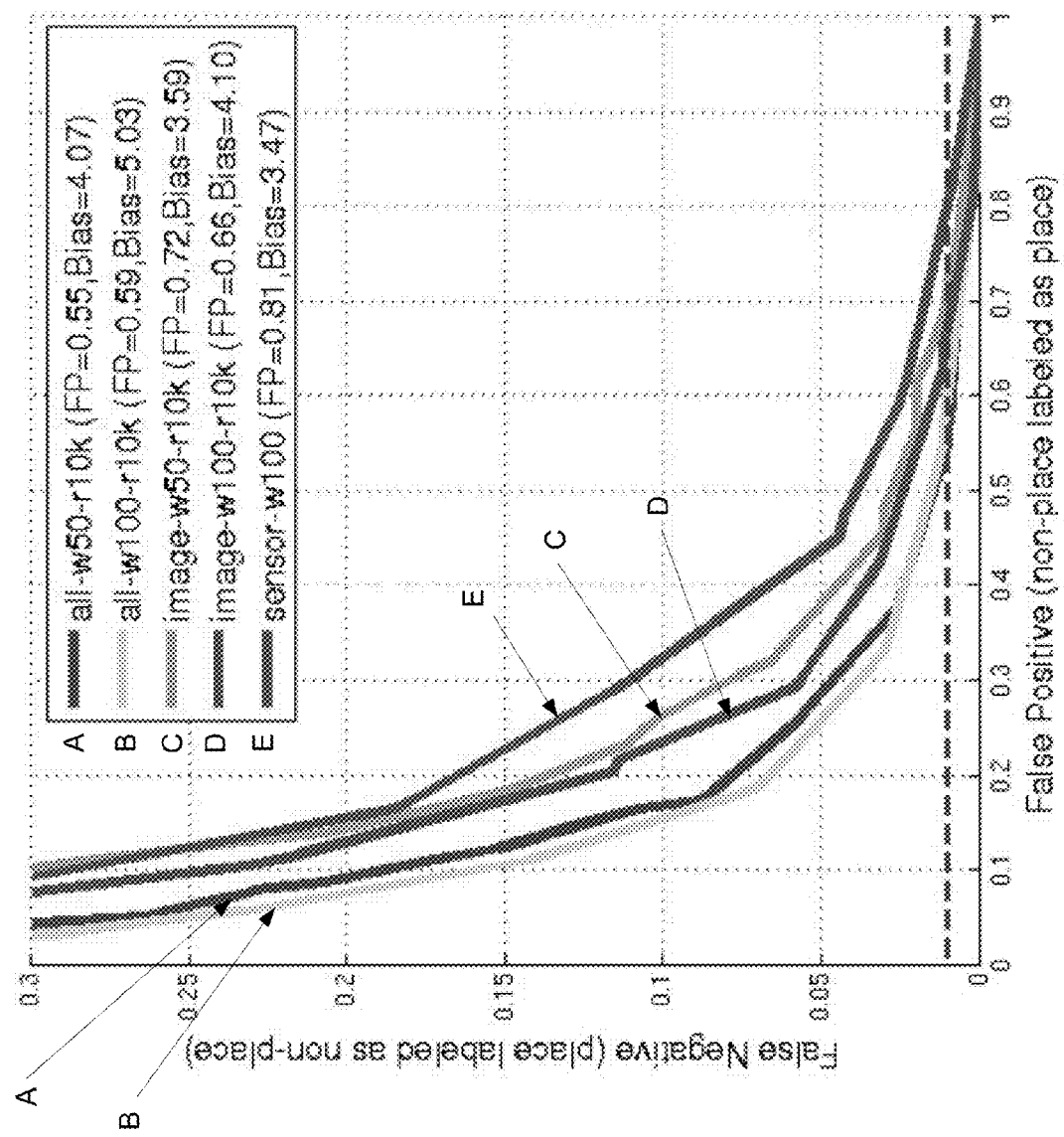
FIGS. 10A-C illustrate receiver-operator curves in accordance with aspects of the invention.
Figure 10B:
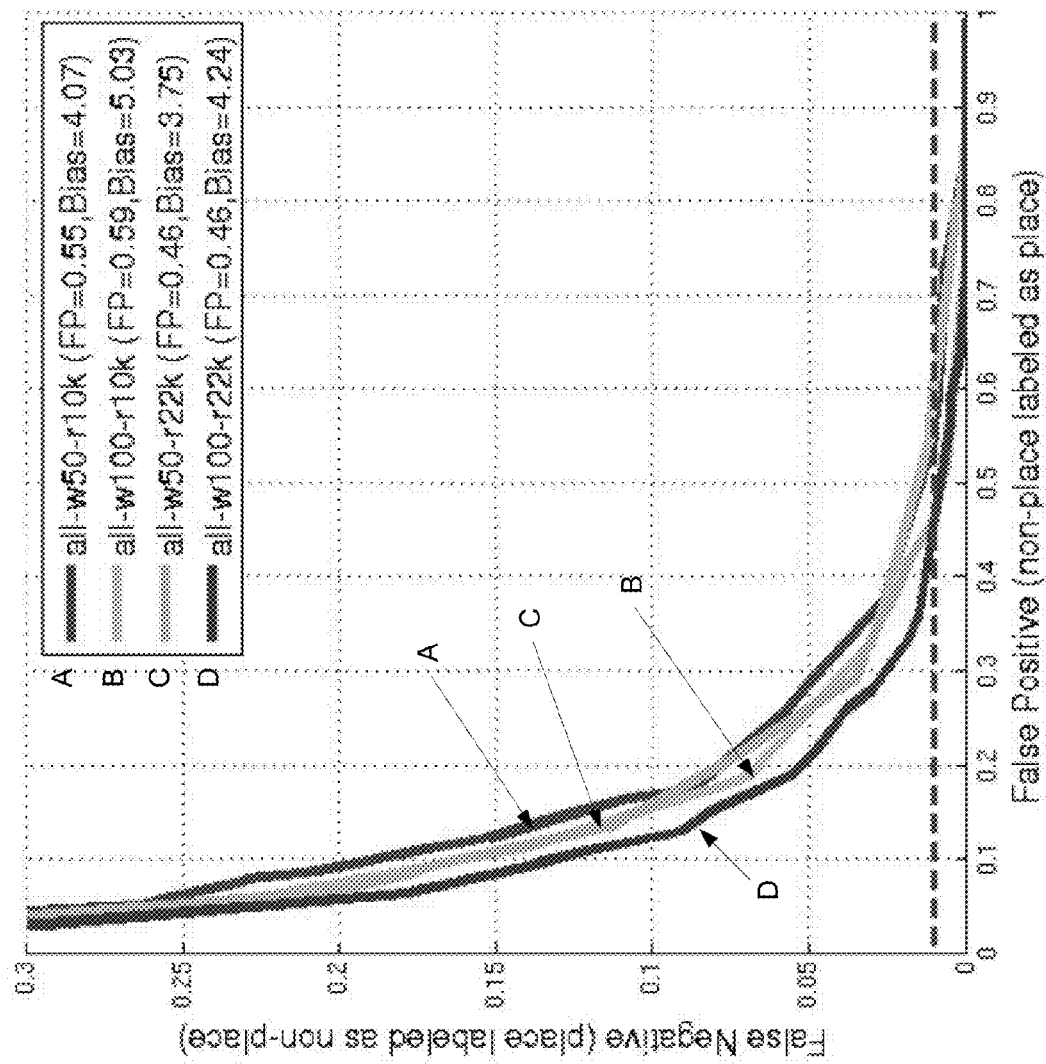
Figure 10C:
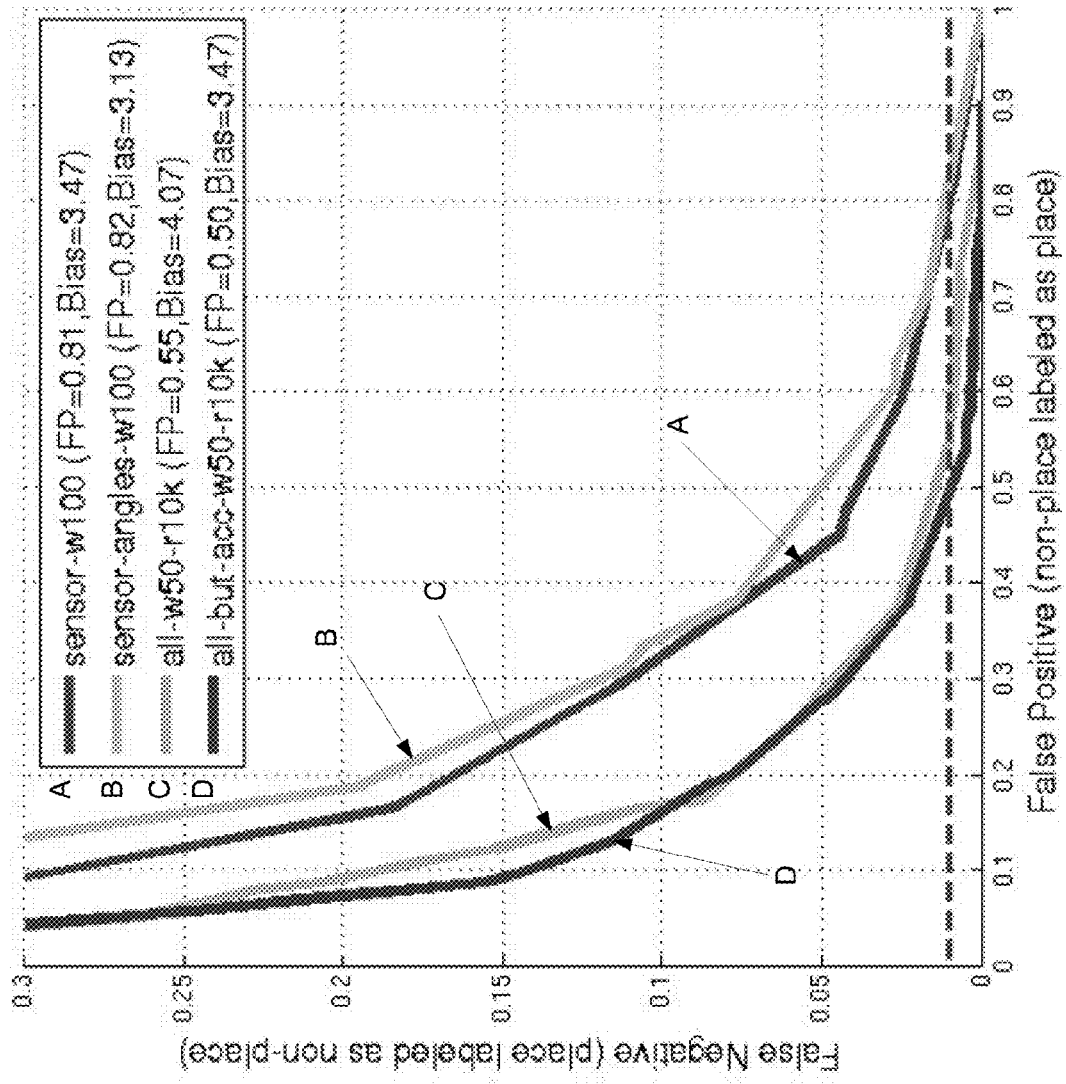

Such measurement weights and thresholds are desirably adjusted to achieve satisfactory false positive and false negative thresholds. FIGS. 10A-C illustrate receiver-operator curves with likelihoods of false positives and false negatives for various conditions. For instance, FIG. 10A shows false positive and false negative rates for an exemplary set of images when comparing different feature combinations. In this figure, "all" in the legend means both image information and metadata have been used, "image" means only image data has been used, and "sensor" means that only metadata has been used. The term "wXX" represents the number of measurements used by the final classifier; here, "w50" means 50 measurements were used and "w100" means 100 measurements were used. FIG. 10B shows false positive and false negative rates for an exemplary set of images when comparing resizing options. In this figure, two different settings for resizing the image are compared. If the image is resized to a smaller image, the image processing is faster because fewer pixels need be processed. However, some information is lost so it is possible that the performance may degrade. Here, "r10k" means the images were resized to have, at most, a 10,000 pixel area. And "r22k" means that the image has, at most, a 22,000 pixel area. This was done for two classifiers, "all-w50" and "all-100". As shown, the performance is almost identical, which suggests that not much information is lost by resizing images down to 10,000 pixels. And FIG. 10C false positive and false negative rates for an exemplary set of images when removing GPS accuracy.

The classification system may be trained to analyze images received from specific devices or devices with specific types of imagers/cameras. Also, image orientation (e.g., landscape vs. portrait) may affect the image analysis, and so this can be taken into account during training.

Figure 9B:
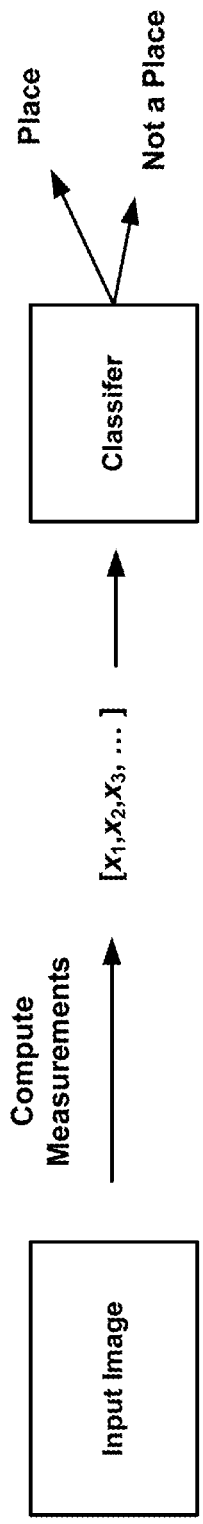

Once the system has been trained, the classifiers may use the measurement weights and thresholds on actual imagery. This is shown in FIG. 9B. Here, measurements are computed for an input image. These may include any of the image data discussed above. The resulting series of variables are supplied to the classifier(s), namely sensor based classifier 702 and/or image and sensor based classifier 704. The classifiers may also employ the AdaBoost algorithm or alternative techniques as described above. The final evaluation indicates whether the image is of a place ("1") or not of a place ("0"). By way of example only, a weighted output may be expressed as follows:

$$\text{Output} = \Sigma_i \alpha_i 1[x_i > \theta_i]$$

This formula sums up the weights corresponding to all measurements ($x_i$) that are above their corresponding thresholds ($\theta i$). Once an overall score or ranking is determined by summing the appropriate weights, a final threshold is applied against the overall score to make a hard decision on whether the image contains a place or not. Thus, 1[v] returns a 1 if input is true (e.g., the image is a place), otherwise it returns a 0 (e.g., the image is not a place). This final threshold may be adjusted depending on what false positive/negative rate is desired.

To determine an appropriate threshold for the overall score, the classifier may be run on a validation ("hold out") data set. This may be a small data set that is not used during training for which ground truth is available (e.g., place/non-place labels). Various thresholds may be tried while measuring the false positive and false negative errors. Depending on what is an acceptable false error rate, a threshold may be chosen that yields a rate close to or at that value.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A method of classifying an image, comprising:
 receiving an image and metadata of the image from a user device;
 performing a first classification of the image using only the metadata to determine whether the image is a place;
 performing a second classification of the image using both the metadata and information about the image to determine whether the image is the place; and
 when either the first or second classification determines that the image is of the place, then preparing place information for presentation by the user device;
 wherein if different filter modules identify the image as being of different types, then the first and second classifications are used to select which filter module identification is correct.

2. The method of claim 1, wherein the image information is either a zoom level or a shutter speed.

3. The method of claim 1, wherein the metadata includes a location of the user device when the image was taken.

4. The method of claim 1, wherein the metadata is location accuracy information.

5. The method of claim 1, wherein the metadata comprises location statistics.

6. The method of claim 1, wherein the metadata is a device orientation that includes at least one of angle, pitch, roll or compass point direction.

7. The method of claim 1, wherein the metadata includes an orientation of the image.

8. A tangible, non-transitory computer-readable recording medium storing a computer program therein, the computer program, when executed by a processor, causing the processor to perform a method of classifying an image, the method comprising:
 receiving an image and metadata of the image from a user device;
 performing a first classification of the image using only the metadata to determine whether the image is a place;
 performing a second classification of the image using both the metadata and information about the image to determine whether the image is the place; and
 when either the first or second classification determines that the image is of the place, then preparing place information for presentation by the user device;
 wherein if different filter modules identify the image as being of different types, then the first and second classifications are used to select which filter module identification is correct.

9. The recording medium of claim 8, wherein the image information is either a zoom level or a shutter speed.

10. The recording medium of claim 8, wherein the metadata includes a location of the user device when the image was taken.

11. The recording medium of claim 8, wherein the metadata is location accuracy information.

12. The recording medium of claim 8, wherein the metadata comprises location statistics.

13. The recording medium of claim 8, wherein the metadata is a device orientation that includes at least one of angle, pitch, roll or compass point direction.

14. An apparatus for classifying an image, the apparatus comprising:
 means for communicating with a mobile user device; and
 at least one processor coupled to the communicating means, the at least one processor configured to:
  receive an image and metadata of the image from a user device;
  perform a first classification of the image using only the metadata to determine whether the image is a place;
  perform a second classification of the image using both the metadata and information about the image to determine whether the image is the place; and
  when either the first or second classification determines that the image is of the place, then prepare place information for presentation by the user device;
  wherein if different filter modules identify the image as being of different types, then the first and second classifications are used to select which filter module identification is correct.

15. The apparatus of claim 14, wherein the image information is either a zoom level or a shutter speed.

16. The apparatus of claim 14, wherein the metadata includes a location of the user device when the image was taken.

17. The apparatus of claim 14, wherein the metadata is location accuracy information.

18. The apparatus of claim 14, wherein the metadata comprises location statistics.

19. The apparatus of claim 14, wherein the metadata is a device orientation that includes at least one of angle, pitch, roll or compass point direction.

20. The apparatus of claim 14, wherein the metadata includes an orientation of the image.

* * * * *